(12) United States Patent
     Onitsuka

(10) Patent No.:    US 12,600,351 B2
(45) Date of Patent:        Apr. 14, 2026

(54) VEHICLE CONTROL DEVICE FOR EXECUTING EMERGENCY STOPPING CONTROL

(71) Applicant: TOYOTA JIDOSHA KABUSHIKI KAISHA, Toyota (JP)

(72) Inventor: Masakatsu Onitsuka, Nisshin (JP)

(73) Assignee: TOYOTA JIDOSHA KABUSHIKI KAISHA, Toyota (JP)

( * ) Notice:    Subject to any disclaimer, the term of this patent is extended or adjusted under 35 U.S.C. 154(b) by 77 days.

(21) Appl. No.: 18/739,346

(22) Filed:    Jun. 11, 2024

(65)              Prior Publication Data

US 2025/0128702 A1      Apr. 24, 2025

(30)          Foreign Application Priority Data

Oct. 24, 2023    (JP) ................................. 2023-182404

(51) Int. Cl.
     *B60W 40/08*          (2012.01)
     *B60W 30/09*          (2012.01)
     *B60W 30/095*         (2012.01)
(52) U.S. Cl.
     CPC ........ *B60W 30/09* (2013.01); *B60W 30/0956* (2013.01); *B60W 40/08* (2013.01); *B60W 2540/223* (2020.02)
(58) Field of Classification Search
     CPC .. B60W 30/09; B60W 30/0956; B60W 40/08; B60W 2540/223; B60W 2540/225; B60W 2540/229; B60W 2540/26
     See application file for complete search history.

(56)              References Cited

U.S. PATENT DOCUMENTS

| | | | |
|---|---|---|---|
| 7,692,534 B2 | 4/2010 | Kataoka et al. | |
| 8,352,124 B2 | 1/2013 | Taguchi | |
| 8,682,500 B2 | 3/2014 | Sakugawa | |
| 8,818,634 B2 | 8/2014 | Fujita et al. | |
| 9,168,953 B2 | 10/2015 | Mitsumoto et al. | |
| 9,599,986 B1 * | 3/2017 | Eberbach ............ | B60W 60/007 |
| 9,714,034 B2 | 7/2017 | Otake et al. | |

(Continued)

FOREIGN PATENT DOCUMENTS

| | | | | |
|---|---|---|---|---|
| CN | 113859217 A | * | 12/2021 | ............ B60W 60/00 |
| DE | 102012001312 A1 | * | 8/2012 | .......... B60W 50/082 |

(Continued)

*Primary Examiner* — Daniel M. Robert
(74) *Attorney, Agent, or Firm* — SoraIP, Inc.

(57)              ABSTRACT

A vehicle control device has a control unit provided which executes driving support control including emergency stopping control for decelerating and stopping a vehicle when an abnormality occurs in a driver based on a first detection value indicating a state in a vehicle, and the control unit is configured to determine that a risk of contact between the vehicle and an object is equal to or higher than a predetermined level based on a second detection value indicating a state outside the vehicle in a state in which the emergency stopping control is not executed based on the predetermined condition, and to forcibly execute the emergency stopping control regardless of an operation state of the emergency stopping control when it is determined that an occupant of a vehicle other than the driver is performing an emergency operation related to driving of the vehicle based on the first detection value.

3 Claims, 3 Drawing Sheets

(56)                    References Cited

U.S. PATENT DOCUMENTS

| | | | |
|---|---|---|---|
| 9,880,558 B2 | 1/2018 | Nakamura | |
| 9,902,399 B2 | 2/2018 | Torii et al. | |
| 10,345,443 B2 | 7/2019 | Masui et al. | |
| 10,611,240 B2 | 4/2020 | Masui et al. | |
| 2003/0085612 A1* | 5/2003 | Bond, III | B60T 8/3275 |
| | | | 188/106 F |
| 2016/0071418 A1* | 3/2016 | Oshida | B60W 30/165 |
| | | | 701/23 |
| 2017/0190331 A1* | 7/2017 | Gupta | B60W 10/20 |
| 2017/0199523 A1* | 7/2017 | Barton-Sweeney | |
| | | | G05D 1/0274 |
| 2017/0316533 A1* | 11/2017 | Goldman-Shenhar | |
| | | | G08G 1/205 |
| 2018/0190120 A1* | 7/2018 | Kim | B60W 30/0953 |
| 2019/0258263 A1* | 8/2019 | Wendel | B60R 21/01556 |
| 2021/0269039 A1* | 9/2021 | Kagerer | B60W 40/04 |
| 2022/0089181 A1* | 3/2022 | Gross | G07C 5/0841 |
| 2023/0278549 A1 | 9/2023 | Onitsuka | |
| 2025/0128702 A1* | 4/2025 | Onitsuka | B60W 30/0956 |

FOREIGN PATENT DOCUMENTS

| | | | | | |
|---|---|---|---|---|---|
| DE | 102020204267 A1 * | 10/2021 | | | B60K 28/06 |
| DE | 102021206932 A1 * | 1/2023 | | | B60W 50/10 |
| JP | 2023-128249 A | 9/2023 | | | |
| WO | WO-2021137777 A1 * | 7/2021 | | | A62C 3/07 |

* cited by examiner

A

S128

LANE DETECTABLE?    NO

YES    S130

EXECUTE LTA

S132

NO DRIVER OPERATION FOR A CERTAIN PERIOD OF TIME?    NO

YES    S134

EXECUTE EDSS

B

S120

S140

HAS THE SEAT BELT OF THE PASSENGER'S SEAT BEEN REMOVED?    NO

YES

YES

S144

IS PASSENGER APPROACHING THE DRIVER'S SIDE?

S142

EMERGENCY OPERATION BEING PERFORMED

S120 : YES

NO    S146

EMERGENCY OPERATION NOT BEING PERFORMED

S120 : NO

VEHICLE CONTROL DEVICE FOR EXECUTING EMERGENCY STOPPING CONTROL

CROSS-REFERENCE TO RELATED APPLICATION

This application claims priority to Japanese Patent Application No. 2023-182404 filed on Oct. 24, 2023, incorporated herein by reference in its entirety.

BACKGROUND

1. Technical Field

The disclosure relates to a vehicle control device and a storage medium for driving assistance of a vehicle.

2. Description of Related Art

Japanese Unexamined Patent Application Publication No. 2023-128249 (JP 2023-128249 A) describes a vehicle control device for stopping a vehicle when an abnormality of a driver of the vehicle occurs. The vehicle control device includes a monitoring unit that monitors a state of the driver, a detection unit that detects environmental information in surroundings of the vehicle, and a control unit that assists the driver in driving. The control unit is configured to, when determination is made that an abnormality of the driver has occurred based on monitoring results from the monitoring unit, execute driving assistance for stopping the vehicle on a shoulder of the road, based on detection results from the detection unit.

Further, this vehicle control device is configured to disable driving assistance functions, based on an operation performed by the driver. The vehicle control device is configured to forcibly enable the driving assistance functions when the driving assistance functions are disabled, and determination results of a risk of the vehicle coming into contact with an object are no lower than a predetermined value.

SUMMARY

With regard to the vehicle control device described in JP 2023-128249, when forcibly enabling the driving assistance functions from a state in which the driving assistance functions are disabled, there is a possibility that the driving assistance functions will not operate reliably depending on detection conditions for detecting a state outside of the vehicle.

An object of the disclosure is to provide a vehicle control device and a storage medium that are capable of improving functions of driving assistance of a vehicle.

An aspect of the disclosure is a vehicle control device including a control unit for executing driving support control including emergency stopping control for decelerating and stopping a vehicle when an abnormality of a driver occurs, based on a first detection value indicating a state in a cabin of the vehicle.

When, in a state in which the emergency stopping control is not executed based on a predetermined condition, a risk of contact between the vehicle and an object is determined to be no lower than a predetermined level based on a second detection value indicating a state outside of the vehicle, and also an emergency operation related to driving of the vehicle is determined to be performed by a passenger of the vehicle other than the driver based on the first detection value, the control unit forcibly executes the emergency stopping control regardless of an operationality state of the emergency stopping control.

According to the disclosure, driving assistance functions of the vehicle can be improved.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
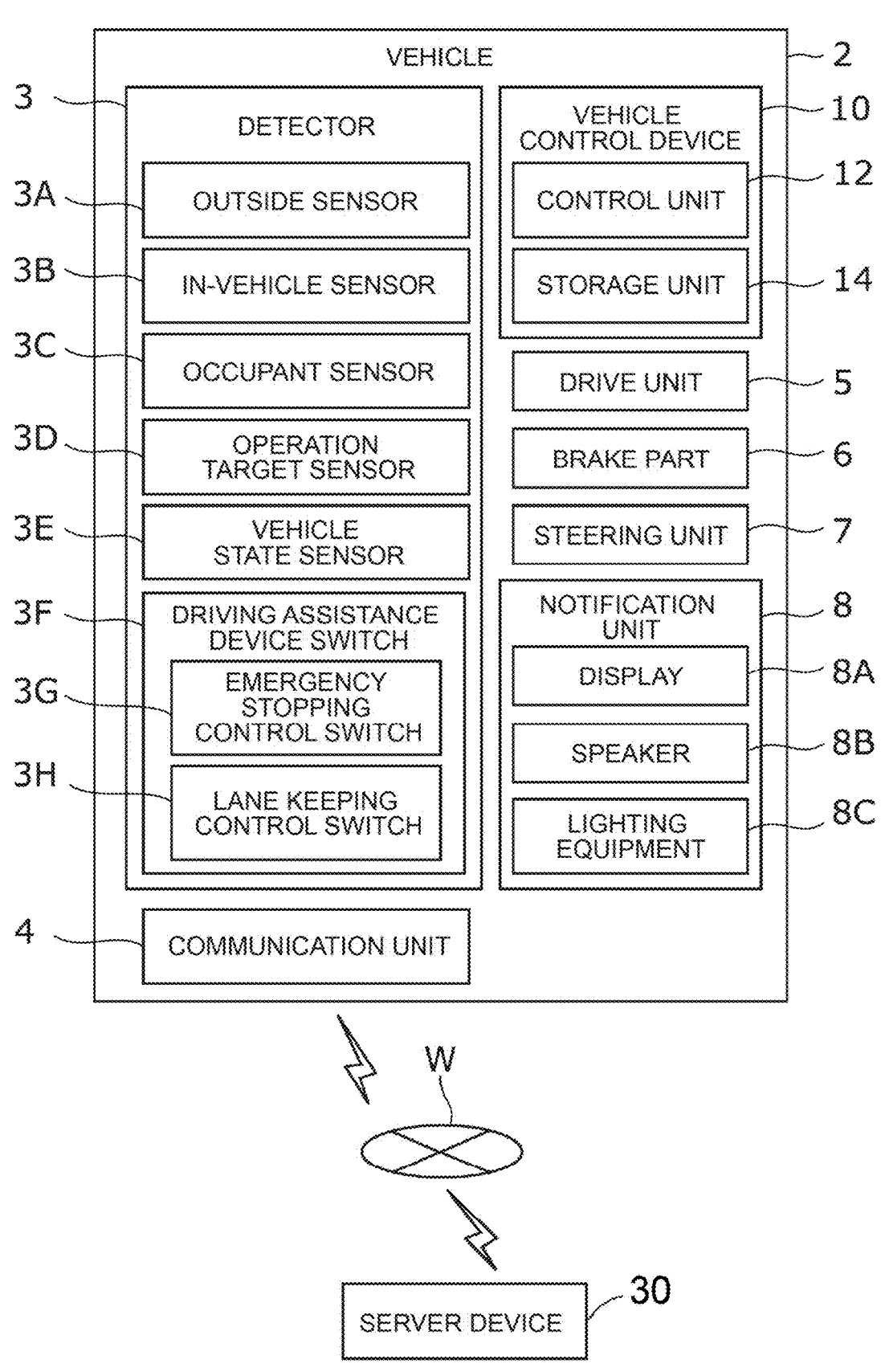
FIG. 1 is a block diagram illustrating a configuration of a vehicle control device according to an embodiment.

As illustrated in FIG. 1, the vehicle system includes a vehicle 2, a vehicle control device 10 provided in the vehicle 2, and a server device 30 communicably connected to the vehicle 2 via a network W. The vehicle 2 is, for example, a manual driving vehicle that travels based on manual driving by a driver. The vehicle 2 may include any drive source mounted on a battery electric vehicle, an internal combustion engine vehicle, a hybrid electric vehicle, or the like.

The vehicle control device 10 performs control on the vehicle 2 for assisting the driver driving the vehicle 2. The server device 30 communicates with the vehicle 2 via the communication unit 4 provided in the vehicle 2. The server device 30 may perform distributed processing of some or all of the computations of the vehicle control device 10, or may update a program installed in the vehicle control device 10.

The vehicle 2 is provided with, for example, a detection unit 3 that outputs a detection value related to the vehicle 2. The vehicle 2 is provided with a notification unit 8 that outputs a predetermined notification to the inside and outside of the vehicle. The vehicle 2 is provided with a vehicle control device 10 for driving assistance control for assisting a driver.

The detection unit 3 is provided with, for example, an outside-vehicle sensor 3A for detecting a condition outside the vehicle. The outside-vehicle sensor 3A includes, for example, a rider device or a radar device that detects an object existing outside the vehicle, and an outside-vehicle camera that captures an image of an environment outside the vehicle. The lidar device detects a distance, a position, and a shape to an object using a laser wave. One or more lidar devices may be provided. The radar apparatus detects a distance to an object using a radar wave. One or more radar apparatuses may be provided. The outside camera outputs a captured image obtained by capturing an environment outside the vehicle. One or more external cameras may be provided.

The detection unit 3 is provided with, for example, an in-vehicle-camera 3B for capturing an image of an in-vehicle condition. For example, the in-vehicle-camera 3B captures an image of a condition of an occupant riding in the vehicle. The occupant is attached so as to be able to image a driver seated in the driver's seat, an occupant other than the driver seated in the passenger's seat, and an occupant seated in the rear seat. The in-vehicle-camera 3B outputs captured images of the in-vehicle. One or more in-vehicle 3B may be provided.

The detection unit 3 is provided with, for example, an occupant sensor 3C for detecting a condition of the occupant regarding the occupant. The occupant sensor 3C includes, for example, a seating sensor that detects a seating condition of the occupant, and a seatbelt sensor that detects attachment and detachment of the seatbelt. The seating sensor is provided on a seating surface of each seat in the vehicle, and detects the presence or absence of the seating of the occupant. The seating sensor is used in conjunction with a safety device such as an airbag device. The seat belt sensor is provided in a receiving portion of a buckle of a seat belt provided in each seat. The seat belt sensor detects an attachment/detachment state of the buckle. The seat belt sensor is used in conjunction with a safety device such as a pretensioner mechanism for controlling a tension state of the seat belt device.

The detection unit 3 is provided with, for example, an operation target sensor 3D that detects an operation condition on an operation target related to an operation of the vehicle. The operation target sensor 3D includes, for example, an accelerator sensor that detects an accelerator operation amount, a brake sensor that detects a brake operation amount, a steering sensor that detects an operation amount of the steering device, a shift position sensor that detects an operation state of the shift range, and the like.

The detection unit 3 is provided with, for example, a vehicle state sensor 3E for detecting the state of the vehicle 2. The vehicle state sensor 3E includes, for example, an acceleration sensor that detects an acceleration of the vehicle 2, an angle sensor that detects a rotational angle of the vehicle 2, a position sensor that detects a present position of the vehicle 2, and the like. The acceleration sensor detects acceleration in three axial directions with respect to the vehicle 2. The angle sensor detects an angular velocity around three axes with respect to the vehicle 2. The acceleration sensor and the angle sensor may be configured by a six-axis sensor. The position sensor is constituted by, for example, a GPS (GlobalPositioningSystem) sensor that detects the coordinates of the present position of the vehicle 2.

The detection unit 3 is provided with a driving assistance device switch 3F for detecting an operating condition of the driving assistance device that assists driving of the vehicle 2. The driving assistance device switch 3F includes, for example, an emergency stopping control switch 3G for emergency stopping control for causing the vehicle to stop in an emergency. The emergency stopping control is a driving support control such as an EDSS (Emergency Driving Stop System) of decelerating the vehicle 2 and stopping the vehicle when an abnormality occurs in the driver. The emergency stopping control switch 3G is a switch for switching the emergency stopping control to the on-state or the off-state.

The driving assistance device switch 3F includes, for example, a lane keeping control switch 3H for lane keeping control. The lane keeping control is a driving assistance control such as a LTA (Lane Tracing Assist) for keeping the lane in which the vehicle 2 is traveling. The lane keeping control switch 3H is a switch for switching the lane keeping control to the on-state or the off-state. The emergency stopping control switch 3G and the lane keeping control switch 3H may be realized by display images displayed on a display unit 8A described later. The detection value based on the state and the operation of the vehicle 2 detected by the detection unit 3 is output to the vehicle control device 10.

The vehicle control device 10 includes a control unit 12 that executes driving assistance control, and a storage unit 14 that stores data and programs. The control unit 12 is constituted by a hardware processor such as at least one CPU (Central Processing Unit). The storage unit 14 includes a non-transitory storage medium such as a hard disk drive (HDD) or a solid state disk (SSD). The storage unit 14 stores computer programs and data necessary for control. The control unit 12 and the storage unit 14 may be provided integrally with the vehicle control device 10 or may be provided separately.

When it is determined that a predetermined abnormality has occurred in the vehicle 2 or the driver based on the detection value detected by the detection unit 3, the control unit 12 controls the traveling device including the drive unit 5, the braking unit 6, the steering unit 7, and the like provided in the vehicle 2 to execute the driving support control. The drive unit 5 includes a power device such as an engine, a transmission device connected to the power device, and the like. The braking unit 6 is configured by a device that decelerates and stops the vehicle 2, such as a brake device. The steering unit 7 is configured by a device for controlling the direction of the vehicle 2. When the vehicles 2 are battery electric vehicle, the drive unit 5, the braking unit 6, and the steering unit 7 may be integrated by at least one device.

When the driving assistance control is executed, the control unit 12 controls the notification unit 8 provided in the vehicle 2 to output a predetermined notification. The notification unit 8 includes, for example, a display unit 8A that outputs predetermined information based on a display image, a speaker 8B that outputs predetermined information based on an audio output, and a lighting device 8C that outputs an emergency flashing light. The display unit 8A includes a display device such as a liquid crystal display. The lighting device 8C includes a brake lamp, a blinker lamp, and the like.

The control unit 12 executes the driving assistance control including the emergency stopping control for decelerating and stopping the vehicle when an abnormality occurs in the driver, based on the first detection value indicating the state in the vehicle of the vehicle 2. When the emergency stopping control is started, the control unit 12 controls the braking unit 6 to decelerate the vehicle 2, and then stops. In parallel with the control of the braking unit 6, the control unit 12 may control the steering unit 7 to stop the vehicle 2 at a position where the safety of the road shoulder or the like can be secured, based on the detection value of the outside-vehicle sensor 3A. During the execution of the emergency stopping control, the control unit 12 controls the notification unit 8 to notify the inside and outside of the vehicle 2 of the occurrence of abnormality.

The control unit 12 causes the display unit 8A to display images indicating that the emergency stopping control is being executed while the emergency stopping control is being executed. The control unit 12 causes the speaker to output a predetermined alarm sound during execution of the emergency stopping control. The control unit 12 controls the lighting device 8C to turn on the stop lamp and blink the hazard lamp while the emergency stopping control is being executed. The control unit 12 may sound a horn (not shown) during execution of the emergency stopping control. The control unit 12 may disable the operation on the accelerator pedal during the execution of the emergency stopping control. The first detection value includes a detection value related to the state in the vehicle detected by the detection unit 3.

The first detection value includes, for example, a captured image of the in-vehicle camera 3B and a detection value of the occupant sensor 3C. For example, the control unit 12 executes the emergency stopping control when the emergency stopping control switch 3G detection value is detected to be in the on-state on the basis of the operation of the occupant. The control unit 12 may display a display image including a release button for releasing the emergency stopping control on the display unit 8A constituted by the touch panel while the emergency stopping control is being executed. The control unit 12 may release the emergency stopping control based on the operation of the release button.

The control unit 12 may monitor the behavior of the driver based on the captured images captured by the in-vehicle camera 3B, and automatically turn on the emergency stopping control switch 3G and execute the emergency stopping control when it is determined that an abnormality has occurred in the driver. For example, the control unit 12 determines whether or not an abnormality has occurred in the driver based on the captured image. The control unit 12 is configured to be able to determine the state of the driver captured in the captured image based on supervised machine learning such as deep learning in advance. The control unit 12 monitors the behavior of the driver captured in the captured image, and determines that an abnormality has occurred in the driver when a state in which the driver is performing an operation different from a normal state such as the driver is not operating, the eyes are closed, the driver is leaning, or the like is detected.

The control unit 12 determines an operation state of the driver to the driving operation target on the basis of a detection value indicating an operation state of the driving operation target such as an accelerator pedal, a brake pedal, or a steering wheel. When the control unit 12 detects a state in which the operation state of the driver to the driving operation target does not change for a predetermined time or longer, it determines that an abnormality has occurred in the driver. When determining that an abnormality has occurred in the driver based on the detection value, the control unit 12 executes the emergency stopping control.

When determining that an occupant of the vehicle 2 other than the driver is performing an emergency operation related to the driving of the vehicle 2 based on the captured image of the in-vehicle camera 3B, the detection value of the occupant sensor 3C, and the detection value of the operation target sensor 3D, the control unit 12 determines that an abnormality has occurred in the driver. Emergency operations include various operations to decelerate the vehicle 2, such as steering wheel operations, shift operations, braking operations, and light operations, and to retract it to a predetermined position to reduce the impact on subsequent traffic.

The control unit 12 detects, for example, a state in which the seat belt of the passenger seat is removed based on the detection value of the seat belt sensor. The control unit 12 detects a state in which the occupant of the passenger seat is inclined from the seated state to the driver side based on the detection value of the seating sensor. The control unit 12 detects a condition in which an operation on an operation target such as a steering wheel is being performed on the basis of a detection value of the operation target sensor 3D.

The control unit 12 determines that the emergency operation is being performed when it is detected that the occupant of the passenger seat has continued the second boarding posture approaching the driver side from the first boarding posture in which the occupant of the passenger seat is seated on the seat for a predetermined time or longer based on the detection value of the seating sensor of the passenger seat and the detection value of the attachment and detachment of the seat belt of the passenger seat. The control unit 12 determines that the emergency operation is being performed when it is detected that the occupant of the rear seat has continued the second boarding posture approaching the driver side from the first boarding posture in which the occupant of the rear seat is seated on the seat for a predetermined time or longer based on the attachment/detachment detection value of the seat belt of the rear seat.

The control unit 12 determines the seating position and the first boarding posture of the occupant based on the seating detection value of the seating sensor, and determines the second boarding posture based on the seating detection value of the seat belt. When the detection value is detected, the control unit 12 determines that an occupant of the passenger seat is going to perform an emergency operation of the vehicle 2, and determines that an abnormality has occurred in the driver. The control unit 12 may determine that the occupant of the passenger seat intends to operate the vehicle 2 on the basis of the captured images of the in-vehicle camera 3B, and may determine that an abnormality has occurred in the driver. When determining that an abnormality has occurred in the driver based on the determination result, the control unit 12 forcibly turns on the emergency stopping control regardless of the operating state based on the operating state of the emergency stopping control switch 3G, and executes the emergency stopping control.

The control unit 12 executes the lane keeping control when the lane keeping control switch 3H is detected. In the lane keeping control, the control unit 12 supports and controls the steering unit 7 so that the vehicle 2 travels in the vicinity of the center of the lane. The control unit 12 determines whether or not the vehicle 2 is traveling while maintaining an area inside the pair of lane marks, based on captured images of lanes of roads captured by the outside cameras included in the outside-vehicle sensor 3A. When approaching one of the pair of lane marks within a predetermined distance, the control unit 12 controls the steering unit 7 so as to return the vehicle 2 to the vicinity of the center of the lane, thereby suppressing the vehicle 2 from deviating from the lane.

The control unit 12 executes the emergency stopping control when it is detected that the emergency stopping control switch 3G is in the on-state on the basis of an operation of the driver or the occupant during the execution of the lane keeping control. The control unit 12 controls the notification unit 8 to output a predetermined notification while the emergency stopping control is being executed. When it is determined that an abnormality has occurred in the driver during the execution of the lane keeping control, the control unit 12 forcibly turns on the emergency stopping control and executes the emergency stopping control regardless of the operating state based on the operating state of the emergency stopping control switch 3G.

In an emergency, the control unit 12 performs the emergency stopping control by forcibly setting the emergency stopping control to the ON state regardless of the operating state based on the operating state of the emergency stopping control switch 3G. In a state in which the emergency stopping control is not executed based on the predetermined condition, when the following condition is satisfied, the control unit 12 forcibly executes the emergency stopping control regardless of the operation state of the emergency stopping control. The predetermined condition includes a state in which the emergency stopping control switch 3G is turned off by an operation of a driver or an occupant, a state in which a lane cannot be detected due to a traveling condition such as traveling a sudden curve in lane keeping control, and a case in which the lane keeping control switch 3H is in an off state.

When a lane cannot be detected in the lane keeping control or when the lane keeping control is in an off state, the vehicle 2 is at risk of coming into contact with an object existing in the surroundings. The control unit 12 calculates a risk of contact between the vehicle and the object on the basis of the second detection value indicating the state of the vehicle outside the vehicle. The second detection value includes, for example, a detection value such as a captured image of the outside camera, a detection value of the rider device, a detection value of the radar device, and a calculation value based on inter-vehicle communication.

In a state in which the emergency stopping control is not executed based on the predetermined condition, the control unit 12 determines whether or not the risk of contact between the vehicle and the target object is equal to or higher than a predetermined level based on the second detection value indicating the state outside the vehicle. The predetermined level is set based on, for example, a distance between the vehicle 2 and an object. The predetermined level may be determined based on the degree of contact between the vehicle 2 and the object.

The control unit 12 determines whether or not an occupant of a vehicle other than the driver performs an emergency operation related to the driving of the vehicle based on the first detection value. The control unit 12 performs the lane keeping control and the emergency stopping control by forcibly setting the emergency stopping control to the ON state regardless of the operation state based on the operation state of the emergency stopping control switch 3G when it is determined that the risk is equal to or higher than the predetermined level and when it is determined that the occupant of the vehicle other than the driver is performing the emergency operation related to the driving of the vehicle.

Figure 2:
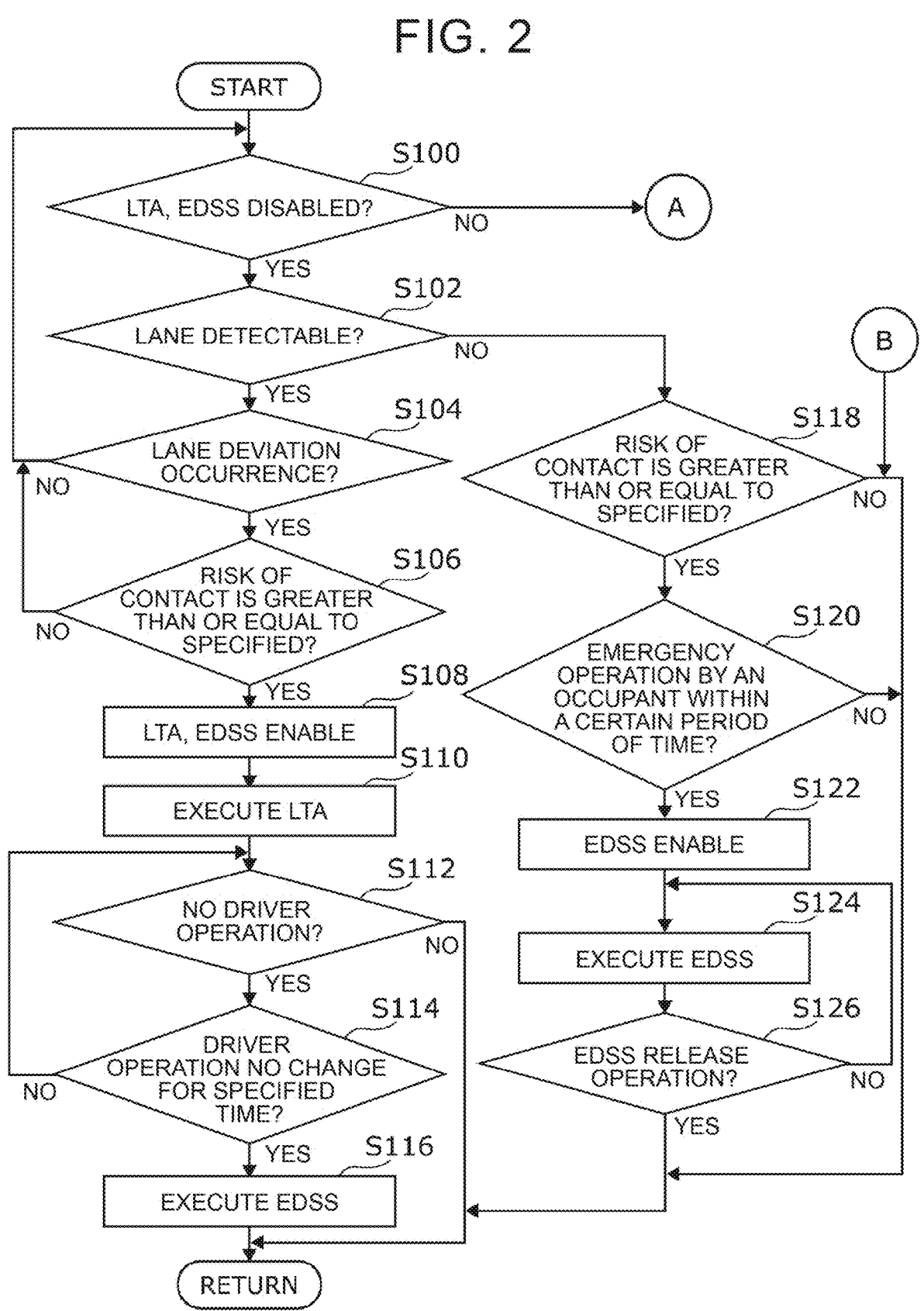
FIG. 2 is a flowchart illustrating a flow of processing of the vehicle control method.
Figures 3, 4:
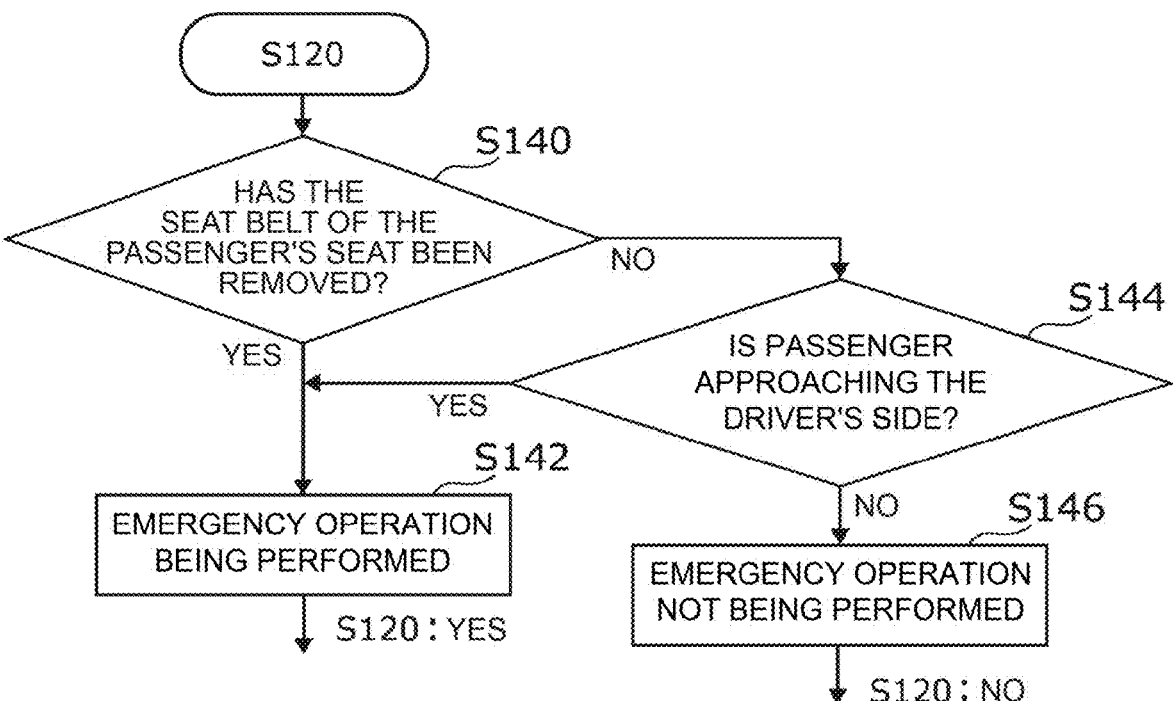
FIG. 3 is a flow chart showing a flow of a process of the vehicle-control method.
FIG. 4 is a flowchart illustrating a process of determining an emergency operation of an occupant.

FIG. 2 and FIG. 3 show a flow of processing of the vehicle control method executed in the vehicle control device 10. The vehicle control method is executed based on a program installed in a computer installed in the vehicle control device 10. The program causes the computer to execute the following processing. The control unit 12 determines whether or not the driving assistance control including the lane keeping control (LTA) and the emergency stopping control (EDSS) is in the disabled state based on the predetermined condition in the state in which the vehicle 2 is in operation (S100). When it is determined that the driving assistance control is invalid (S100: Yes), the control unit 12 determines whether or not the lane is detectable based on the second detection value indicating the condition outside the vehicle (S102).

When the lane can be detected (S102: Yes), the control unit 12 determines whether or not the vehicle 2 deviates from the lane (S104). In the determination process, the control unit 12 determines whether or not any one of the pair of lane marks constituting the lane is approaching within a predetermined distance. When it is determined that the vehicle 2 does not deviate from the lane (S104: No), the control unit 12 returns the process to S100.

When it is determined that the vehicle 2 deviates from the lane (S104: Yes), the control unit 12 determines whether or not the vehicle 2 contacts with an object existing in the surroundings is equal to or higher than a predetermined level (S106). When the control unit 12 determines that the contact-risk between the vehicle 2 and the surrounding object is less than the predetermined level (S106: No), the process returns to S100. When the control unit 12 determines that the contact-risk between the vehicle 2 and the surrounding object is equal to or higher than the predetermined level (S106: Yes), the lane keeping control and the emergency stopping control are forcibly changed to the on-state regardless of the operating state for the emergency stopping control (S108).

The control unit 12 executes lane keeping control based on the second detection value (S110). The control unit 12 determines whether or not there is no operation on the operation target of the driver based on the detection value of the operation target sensor 3D (S112). When there is an operation on the operation target of the driver (S112: No), the control unit 12 determines that the driver is in a normal state and can operate the operation target, and ends the process. When there is no operation on the operation target of the driver (S112: Yes), the control unit 12 determines whether or not the operation on the operation target of the driver does not change for a predetermined period or more (S114).

The control unit 12 returns the process to S112 when the operation on the operation target of the driver changes during a predetermined period (S114: No). When the operation of the driver to the operation target does not change for a predetermined period (S114: Yes), the control unit 12 executes the emergency stopping control to decelerate and stop the vehicle 2 (S116). The control unit 12 controls the notification unit 8 to output a predetermined notification while the emergency stopping control is being executed.

When the lane cannot be detected in S102, the control unit 12 determines whether or not the contact-risk between the vehicle 2 and the surrounding object is equal to or higher than a predetermined level based on the second detection value (S118). When the control unit 12 determines that the object existing in the surroundings of the vehicle 2 is less than the predetermined level (S118: No), the process ends. When the control unit 12 determines that the contact-risk between the vehicle 2 and the surrounding object is equal to or higher than the predetermined level (S118: Yes), it determines whether or not an occupant of the vehicle other than the driver performs an emergency operation related to the driving of the vehicle 2 on the basis of the first detection value indicating the condition inside the vehicle (S120).

When it is determined that an occupant of a vehicle other than the driver is performing an emergency operation related to the driving of the vehicle 2 (S120: Yes), the control unit 12 forcibly changes the emergency stopping control to the on-state regardless of the operation state for the emergency stopping control (S122). The control unit 12 forcibly executes the emergency stopping control to decelerate and stop the vehicles 2 (S124). The control unit 12 controls the notification unit 8 to output a predetermined notification while the emergency stopping control is being executed. The control unit 12 determines whether or not an operation for releasing the emergency stopping control has been performed based on the operation status of the emergency stopping control switch 3G (S126).

When it is determined that the operation for releasing the emergency stopping control has been performed (S126: Yes), the control unit 12 ends the process. When it is determined that the operation for releasing the emergency stopping control is not performed (S126: No), the control unit 12 returns the process to S124 and continues the emergency stopping control.

When the control unit 12 determines in S100 that the driving assistance control is not invalid (S100: No), it determines whether or not the lane can be detected in the lane keeping control (S128). When it is determined that the lane cannot be detected (S128: No), the control unit 12 ends the process because the driver is operable. When it is determined that the lane can be detected (S128: Yes), the control unit 12 executes the lane keeping control (S130). While the lane keeping control is being executed, the control unit 12 determines whether or not there is no operation on the operation target of the driver based on the detection value of the operation target sensor 3D (S132).

When there is an operation on the operation target of the driver (S132: No), the control unit 12 determines that the driver is in a normal state and can operate the operation target, and ends the process. When there is no operation on the operation target of the driver (S132: Yes), the control unit 12 executes the emergency stopping control to decelerate and stop the vehicle 2 (S134). The control unit 12 controls the notification unit 8 to output a predetermined notification while the emergency stopping control is being executed.

FIG. 4 shows a flow of a process of determining an emergency operation related to the driving of the vehicle 2 by the occupant, which is executed in the process of S120. The control unit 12 determines the seating position of the occupant other than the driver based on the seating detection value included in the first detection value, and determines whether or not the seat belt has been removed based on the seating detection value of the seat belt included in the first detection value (S140). When the seat belt is removed (S140: Yes), the control unit 12 determines that the occupant of the passenger seat or the rear seat is in the second boarding posture approaching the driver from the first boarding posture in which the occupant is seated in the seat, and determines that the occupant is performing emergency operation (S142). When the seat belt is not disconnected (S140: No), the control unit 12 determines whether or not the second boarding posture in which the occupant approaches the driver from the first boarding posture in which the occupant sits on the seat continues for a predetermined period or longer based on the first detection value (S144).

When the control unit 12 detects that the second riding attitude has continued for a predetermined period or longer (S144: Yes), it determines that the passenger occupant of the passenger seat is performing emergency operation (S142). When the control unit 12 detects that the second riding attitude does not continue for a predetermined period or longer (S144: No), it determines that the occupant of the passenger seat is not performing an emergency operation (S146).

As described above, according to the vehicle control device 10, since the abnormality occurring in the driver is determined based on not only the second detection value indicating the state outside the vehicle but also the first detection value indicating the state inside the vehicle, the function of the driving assistance control of the vehicle 2 can be improved. According to the vehicle control device 10, even in a state in which the driving support control is not executed based on the predetermined condition, a case in which the driving support control is necessary is detected. By forcibly enabling the driving assistance control to be executed, the function of the driving assistance control of the vehicle 2 can be improved. According to the vehicle control device 10, it is possible to improve the effectiveness of the execution of the forced driving support control by determining the emergency operation of not only the driver but also the occupant other than the driver.

In the above-described embodiment, the computer program executed in each configuration of the vehicle control device 10 may be provided in a form recorded in a computer-readable portable recording medium such as a semiconductor memory, a magnetic recording medium, or an optical recording medium.

What is claimed is:

1. A vehicle control device, comprising
a control unit implemented by a processor for executing driving support control including
emergency stopping control for decelerating and stopping a vehicle when an abnormality of a driver of the vehicle occurs,
the abnormality being detected based on a first detection value indicating a state in a cabin of the vehicle, wherein,
the control unit is configured to:
determine whether the emergency stopping control is in a disabled state based on a predetermined condition, the predetermined condition including a state in which an emergency stopping control switch is turned off;
determine whether a lane is detectable based on a second detection value indicating a state outside of the vehicle, in a case where it is determined that the emergency stopping control is in the disabled state;
determine whether a risk of contact between the vehicle and an object is equal to or greater than a predetermined level based on the second detection value, in a case where it is determined that the lane is not detectable;
determine whether an emergency operation related to driving of the vehicle is being performed by a passenger of the vehicle other than the driver based on the first detection value, in a case where it is determined that the risk of contact is equal to or greater than the predetermined level; and
forcibly enable and execute the emergency stopping control regardless of the emergency stopping control switch being turned off, in a case where it is determined that the emergency operation is being performed by the passenger of the vehicle other than the driver.

2. The vehicle control device according to claim 1, wherein
the control unit is further configured to determine that the emergency operation is being performed by the passenger when detection is made based on the first detection value that the passenger continues a second riding posture, in which the passenger is nearer to a side of the driver than in a first riding posture of sitting in a seat, for a predetermined amount of time or more.

3. The vehicle control device according to claim 2, wherein
the control unit is further configured to
determine a seating position of the passenger based on a seating-detection value included in the first detection value, and
determine the second riding posture based on a seatbelt fastening state detection value that is included in the first detection value.

* * * * *